United States Patent
Weber et al.

(10) Patent No.: US 6,521,192 B1
(45) Date of Patent: Feb. 18, 2003

(54) REJUVENABLE AMBIENT TEMPERATURE PURIFIER

(75) Inventors: Daniel K. Weber, Atascadero, CA (US); Giorgio Vergani, Monza (IT)

(73) Assignee: Saes Pure Gas, Inc., San Luis Obispo, CA (US)

( * ) Notice: Subject to any disclaimer, the term of this patent is extended or adjusted under 35 U.S.C. 154(b) by 0 days.

(21) Appl. No.: 09/369,644

(22) Filed: Aug. 6, 1999

(51) Int. Cl.⁷ .......................... B01D 53/04; B01D 53/34
(52) U.S. Cl. ........................ 422/177; 422/168; 422/171
(58) Field of Search .......................... 420/422; 422/171, 422/177, 168; 423/210, 219, 220, 248

(56) References Cited

U.S. PATENT DOCUMENTS

| | | | |
|---|---|---|---|
| 3,609,871 A | 10/1971 | Ellison | 34/393 |
| 4,515,528 A | 5/1985 | Young | 417/51 |
| 4,713,224 A | 12/1987 | Tamhankar et al. | 423/219 |
| 5,194,233 A | 3/1993 | Kitahara et al. | 423/210 |
| 5,294,422 A | 3/1994 | Kitahara et al. | 423/245 |
| 5,492,682 A | 2/1996 | Succi et al. | 423/210 |
| 5,543,687 A | 8/1996 | Woyke et al. | 313/556 |
| 5,556,603 A | 9/1996 | Succi et al. | 422/213 |
| 5,558,844 A | 9/1996 | Succi et al. | 423/230 |
| 5,607,572 A | 3/1997 | Joshi | 423/219 |
| 5,902,561 A | 5/1999 | Carrea et al. | 423/210 |
| 6,076,727 A * | 6/2000 | Evans et al. | 228/183 |

FOREIGN PATENT DOCUMENTS

| | | |
|---|---|---|
| EP | 240270 | 10/1987 |
| EP | 422559 | 4/1991 |
| EP | 0 365 490 | 11/1993 |
| EP | 869195 | 10/1998 |
| JP | 63064901 | 3/1988 |
| WO | PCT/US 00/21498 | 4/2000 |

OTHER PUBLICATIONS

Aeronex, High Purity Fluid Delivery, www.aeronex.com, Reviewed/Printed Oct. 26, 1999.

* cited by examiner

*Primary Examiner*—Hien Tran
(74) *Attorney, Agent, or Firm*—Perkins Coie LLP

(57) ABSTRACT

A rejuvenable ambient temperature purifier is provided. The purifier includes an enclosure with a chamber having an inlet and an outlet. Purifier material comprising a mixture of a transition metal material and a getter material is disposed within the chamber. The transition metal material is in a dispersed form with at least 5% of the transition metal material being in metallic form. The getter material is also in a dispersed form intermixed with the transition metal material. The getter material is selected from the group including Zr, Ti, Nb, Ta, V, and alloys thereof.

20 Claims, 9 Drawing Sheets

REJUVENABLE AMBIENT TEMPERATURE PURIFIER

BACKGROUND OF THE INVENTION

1. Field of the Invention

The present invention relates generally to gas purification and more particularly to gas purifiers containing dispersed impurity-sorbing materials.

2. Description of the Related Art

Ultra-high purity (UHP) gases are used for the manufacture of semiconductor devices, laboratory research, mass spectrometer instruments and other industries and applications. UHP gases are typically defined as at least 99.9999999% pure gas by volume. There are several methods of producing UHP gases. Purifiers are widely used based on the use of solid materials that can bond impurities in the stream of a main gas, by interacting with the impurity molecules according to a variety of mechanisms.

An important class of gas purifiers exploits the properties of getter alloys, which include Zr, Ti, Nb, Ta, and V based alloys as active elements. Examples of commonly used alloys are an alloy of weight percent composition Zr 70%–V 24.6%–Fe 5.4%, under the trademark St 707; an alloy of composition Zr 76.5%–Fe 23.5%, under the trademark St 198; an alloy of composition Zr 84%–Al 16%, under the trademark St 101; and certain Ti—Ni alloys, all of which are produced and sold in conjunction with gas purifiers by SAES Pure Gas, Inc. of San Luis Obispo, Calif.

The working principle of getter alloys is chemisorption of species such as $O_2$, $H_2O$, CO, $CO_2$ and $CH_4$, through surface adsorption followed by dissociation and diffusion in the bulk of the getter material of the atoms making up the impurity molecules. Some getter alloys may also fix $N_2$ according to the same mechanism. The result is the formation of oxides, carbides or nitrides of the metals of the alloy. Because the species formed are very stable, the sorption of the above mentioned gases by getter alloys is essentially irreversible.

Because getter alloys do not react with noble or inert gases, they are well suited for purification of these gases. By using these alloys it is possible to remove traces of reactive gases from inert gases. Examples of gases that may be purified by means of getter alloys include noble gases, chloroflourocarbons, which are used in the semiconductor industry, and nitrogen $N_2$). For example, $N_2$ may be purified by the St 198 alloy, which has a negligible sorption capability for the gas. Examples of purifiers based on the use of getter alloys are disclosed in UK Patents GB 2,177,079 and GB 2,177,080, in European Patent EP 365490, and in U.S. Pat. No. 5,194,233 and 5,294,422.

FIG. 1A is a schematic illustration of a getter purifier 10 of the prior art during process gas purification at an elevated temperature. Getter purifier 10 includes a chamber 12, which is coupled to an inlet 14 and an outlet 16. Chamber 12 is partially filled with getter material particles 18. A heater 20 heats getter purifier 10 to at least about 300 degrees Celsius. A process gas with gaseous impurities such as water or carbon oxide is introduced into chamber 12 through inlet 14 where getter material particles 18 absorb the traces of water and carbon oxide. A purified process gas then exits chamber 12 through outlet 16.

While getter materials show essentially irreversible gettering for impurities (e.g. oxygen, water, carbon monoxide, carbon dioxide, methane) normally present in noble or relatively inert gases (such as argon, helium and nitrogen) for semiconductor industry, getter materials behave very differently towards hydrogen. In fact, getter materials show reversible gettering for hydrogen, which undergoes an equilibrium reaction with most getter materials. At about room temperature, the pressure of "free" gas at is very low, but the pressure increases with increasing temperature.

FIG. 1B is a schematic illustration of a getter purifier 10 of the prior art during the removal of hydrogen from a process gas. Getter purifier 10 is operational at ambient temperatures (0 to 40 degrees Celsius) to remove traces of hydrogen from process gases. If a process gas with hydrogen is introduced into chamber 12 through inlet 14, getter material particles 18 will absorb the hydrogen, leaving a purified process gas to exit chamber 12 through outlet 16.

Getter based purifiers are highly efficient in removing impurities as shown in FIG. 1A, but they are costly and need to be kept at about 300 to about 450° C. for operation. Therefore, in some circumstances other kinds of purifiers are preferred. An example of lower cost purifiers is the so-called nickel purifiers, which operate at around room temperature. These purifiers include as the active material, metallic nickel, generally supported on a porous substrate such as silica.

FIG. 2A is a schematic illustration of a nickel purifier 22 of the prior art during process gas purification. Nickel purifier 22 includes a chamber 24, which is coupled to an inlet 26 and an outlet 28. Chamber 24 is partially filled with nickel material particles 30. Nickel is typically present in metallic form for at least 5% of the overall amount of nickel material particles 30, with the remainder generally being present as nickel oxide, NiO. Nickel is generally present in a particulate or "dispersed" form, so as to have a high specific area of at least 100 $m^2/g$ and preferably between about 100 and 200 $m^2/g$, but the overall amount of nickel is limited. By "dispersed" it is meant that the material is formed by discrete particles, such as powders, granules, pellets, etc.

Nickel purifiers often also contain physical water sorbers, such as molecular sieves, to help remove water vapor and leave nickel material available for removal of oxygen and carbon oxides. As shown, a process gas, water, and trace amounts of oxygen and carbon oxide enter chamber 24 through inlet 26. During operation of nickel purifier 10, nickel material particles 18 react with oxygen or water and with CO or $CO_2$. The product of the Ni and oxygen or water reaction is NiO. Once the sorbing capacity of nickel material particles 18 has reached its limits, the purifier may be regenerated.

FIG. 2B is a schematic illustration of a nickel purifier 22 of the prior art during the process of regeneration. Nickel material particles 30 are regenerated by passing a flow of hydrogen-containing inert gas over the nickel material particles 30 maintained at a temperature of about 200° C. by heater 20. The inert gas is preferably nitrogen, the amount of hydrogen is preferably below about 20% by volume, and more preferably between about 2 and about 5% by volume of the flowing gas, and the regeneration process is preferably continued for about 14–20 hours. In these conditions NiO and the product of the reaction of Ni and $CO/CO_2$ are reduced to metallic nickel. Nickel purifiers are disclosed, e.g., in U.S. Pat. No. 4,713,224.

Because water and CO are produced during the regeneration step, the operation must be performed with the purifier disconnected from the pure gas line, in order not to pollute the system. A wide range of nickel-based purifiers is sold by Aeronex Inc. of San Diego, Calif. under the name GATE- KEEPER®. Further to the application indicated above, another important use of nickel-based purifiers is in gas cabinets, for the purification of gas (generally nitrogen) used to purge gas pipelines during process gas cylinders change out.

FIG. 3 illustrates another nickel purifier unit 32 of the prior art. Nickel purifier unit 32 includes a body or enclosure 33 defining a chamber 34, which is generally made of stainless steel into an essentially cylindrical shape. Chamber 34 is preferably electropolished to at least 10 Ra. At the two opposing bases of nickel purifier unit 32, a gas inlet 36 and an outlet opening 38 are provided. Gas inlet 36 and outlet opening 38 are typically equipped with suitable fittings 40 for connection to a set of gas lines. Fittings 40 shown are male face seal fittings, but as is well known in the art, compression fittings may also be used. Nickel purifier unit 32 is preferably equipped with particle filters at gas inlet 36 and outlet opening 38. Particle filters are generally made of sintered stainless steel particles and capable of retaining particles of dimensions of 0.003 μm and larger.

The internal volume of nickel purifier 32 is filled with particles of nickel-containing or nickel supporting materials. These materials may be made of formed pieces (spheres or cylinders) of a porous supporting medium, such as silica, over which nickel material is dispersed according to techniques well-known in the field of catalysts production. Nickel may be present in a mixed form, in which part of the metal is present as a compound, generally nickel oxide, NiO, with at least 5% of the metal present in reduced metallic form.

A major disadvantage of nickel-based purifiers is that regeneration is not easily accomplished on site, due to the need of keeping for hours the purifier under a hydrogen-containing gas flow that, at the outlet, need be vented outside the system; as a consequence, for the regeneration operation the purifier must generally be returned to the manufacturer. To avoid service interruptions, producers generally offer systems made up of two nickel purifiers in parallel, so that one can operate while the other is regenerated.

Also well known are purifiers where both getter and nickel beds are used. These purifiers are disclosed, e.g. in U.S. Pat. Nos. 5,492,682, 5,558,844, 5,556,603 and 5,902,561. These patents show two-stage purifiers, in which the gas first contacts a bed of nickel material kept at room temperature and then a second bed of getter material maintained at a temperature of between about 250 to about 400° C. In these purifiers each bed works according to its normal operation as described before.

In view of the foregoing, it is desirable to have a method and apparatus for efficiently and economically rejuvenating a gas purifier, particularly so that it is possible to rejuvenate the purifier on site.

SUMMARY OF THE INVENTION

The present invention provides a method and apparatus to purify various gases utilizing a gas purifier capable of operating at room temperature, but such that can easily be rejuvenated at the point of use when saturated by simply isolating it from the gas line it is inserted in and heating the apparatus at a pre-set temperature. It should be appreciated that the present invention can be implemented in numerous ways, including as a process, an apparatus, a system, a device or a method. Several inventive embodiments of the present invention are described below.

In one embodiment of the present invention, a rejuvenable ambient temperature purifier is provided. The purifier includes an enclosure with a chamber having an inlet and an outlet. Purifier material is disposed within the chamber. The transition metal material is preferably in a dispersed form with preferably at least 5% of the transition metal material being in a metallic form. The getter material is also preferably in a dispersed form intermixed with the transition metal material. The getter material is preferably selected from the group including Zr, Ti, Nb, Ta, V, and alloys thereof.

In another embodiment of the present invention, a rejuvenable ambient temperature purifier system is provided. The system comprises a purifier including an enclosure with a chamber having an inlet and an outlet. Purifier material comprising a mixture of a transition metal material and a getter material is disposed within the chamber. The transition metal material is preferably in a dispersed form with preferably at least 5% of the transition metal material being in metallic form. The getter material is also preferably in a dispersed form intermixed with the transition metal material. The getter material is selected from the group including Zr, Ti, Nb, Ta, V, and alloys thereof. The purifier system also includes an inlet valve coupled to the inlet and an outlet valve coupled to the outlet. A heater is associated with the purifier for heating the purifier to at least about 200 degrees Celsius.

In yet another embodiment of the present invention, a method for rejuvenating an ambient temperature purifier having a mixture of transition metal material and getter material is provided. The method includes sealing a purifier in a working environment. A mixture of a transition metal material and a getter material are disposed within the purifier chamber. The transition metal material is preferably in a dispersed form with preferably at least 5% of the transition metal material being in metallic form. The getter material is also preferably in a dispersed form intermixed with the transition metal material. The getter material is preferably selected from the group including Zr, Ti, Nb, Ta, V, and alloys thereof. The purifier is heated to at least about 200 degrees Celsius, and then cooled so that the purifier can achieve a substantially ambient temperature of its working environment. Finally, the purifier is unsealed, and ready to be used again.

In yet another embodiment of the present invention, a method for purifying gases at ambient temperatures is provided. The method includes providing a purifier having a sealable enclosure. The enclosure defines a chamber having an inlet and an outlet. A mixture of a transition metal material and a getter material are disposed within the purifier chamber. The transition metal material is preferably in a dispersed form with preferably at least 5% of the transition metal material being in metallic form. The getter material is also preferably in a dispersed form intermixed with the transition metal material. The getter material is preferably selected from the group including Zr, Ti, Nb, Ta, V, and alloys thereof. Gases flowing into the inlet are purified through the purifier material. Gas then flows out of the outlet at about ambient temperatures, whereby the transition metal material adsorbs water, oxygen and carbon monoxide and the getter material adsorbs hydrogen. The inlet and outlet are then closed to seal the enclosure.

The purifier is heated to at least 200 degrees Celsius, whereby the getter material releases hydrogen. The hydrogen removes oxygen and carbon from the transition metal material. Excess hydrogen is then adsorbed by the getter material. The purifier is then cooled so that the purifier can return to about ambient temperature of its working environment. Finally, the purifier is unsealed by opening the inlet and outlet, rejuvenated for the purification of gases.

An advantage of the present invention is that it provides a gas purification apparatus and method, that adds the capability of rejuvenation to transition metal material based purifiers. Rejuvenation of the purifier increases efficiency and reduces the number of times a purifier must be returned to the manufacturer for servicing. These and other advantages of the present invention will become apparent to those skilled in the art upon reading the following detailed descriptions and studying the various figures and drawings.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A method and apparatus for rejuvenating purifiers is provided. In the following description, numerous specific details are set forth in order to provide a thorough understanding of the present invention. It will be understood, however, to one skilled in the art, that the present invention may be practiced without some or all of these specific details. In other instances, well known process acts have not been described in detail in order not to unnecessarily obscure the present invention.

Figure 1A:
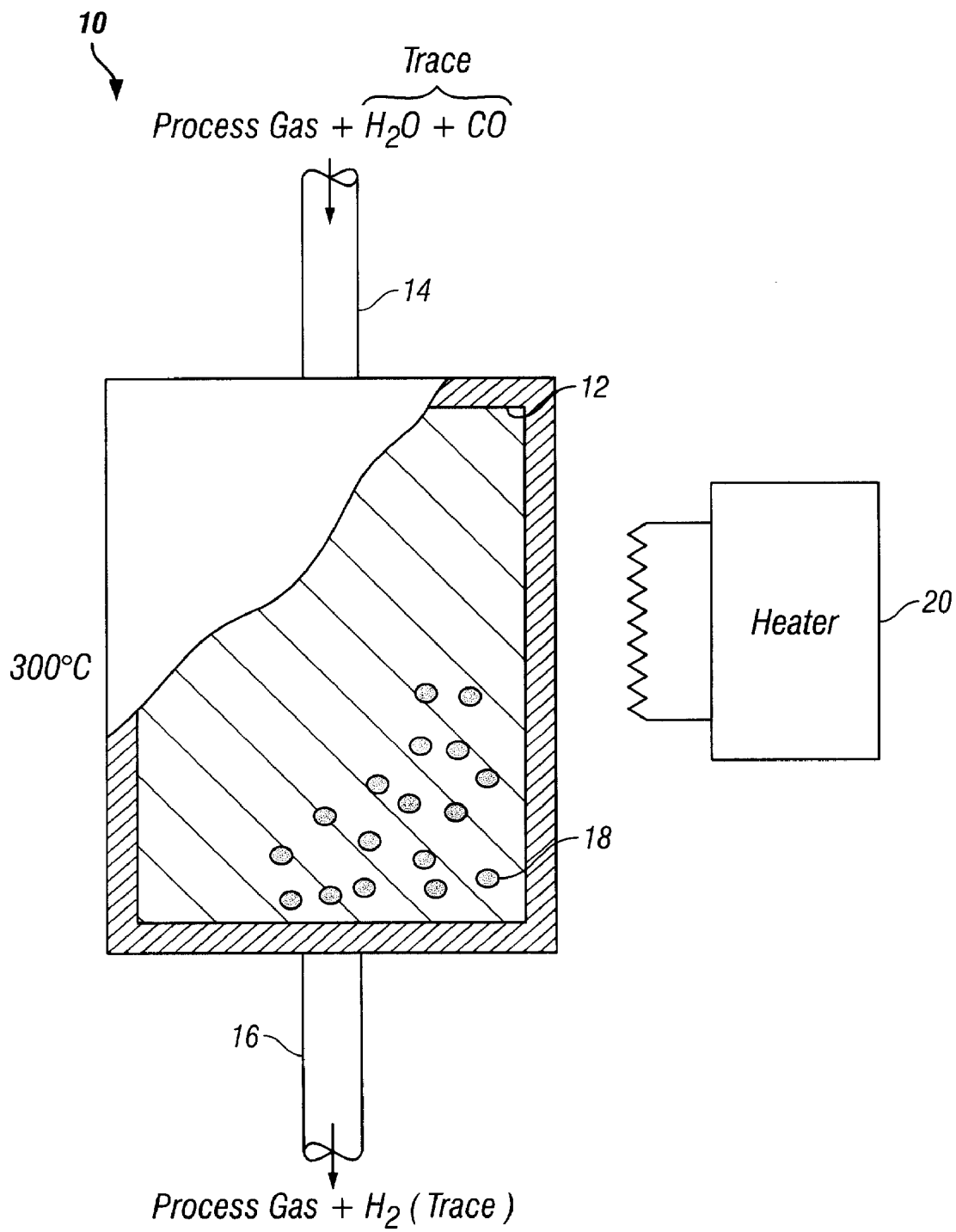
FIG. 1A is a schematic illustration of a getter purifier of the prior art during process gas purification at an elevated temperature.
Figure 1B:
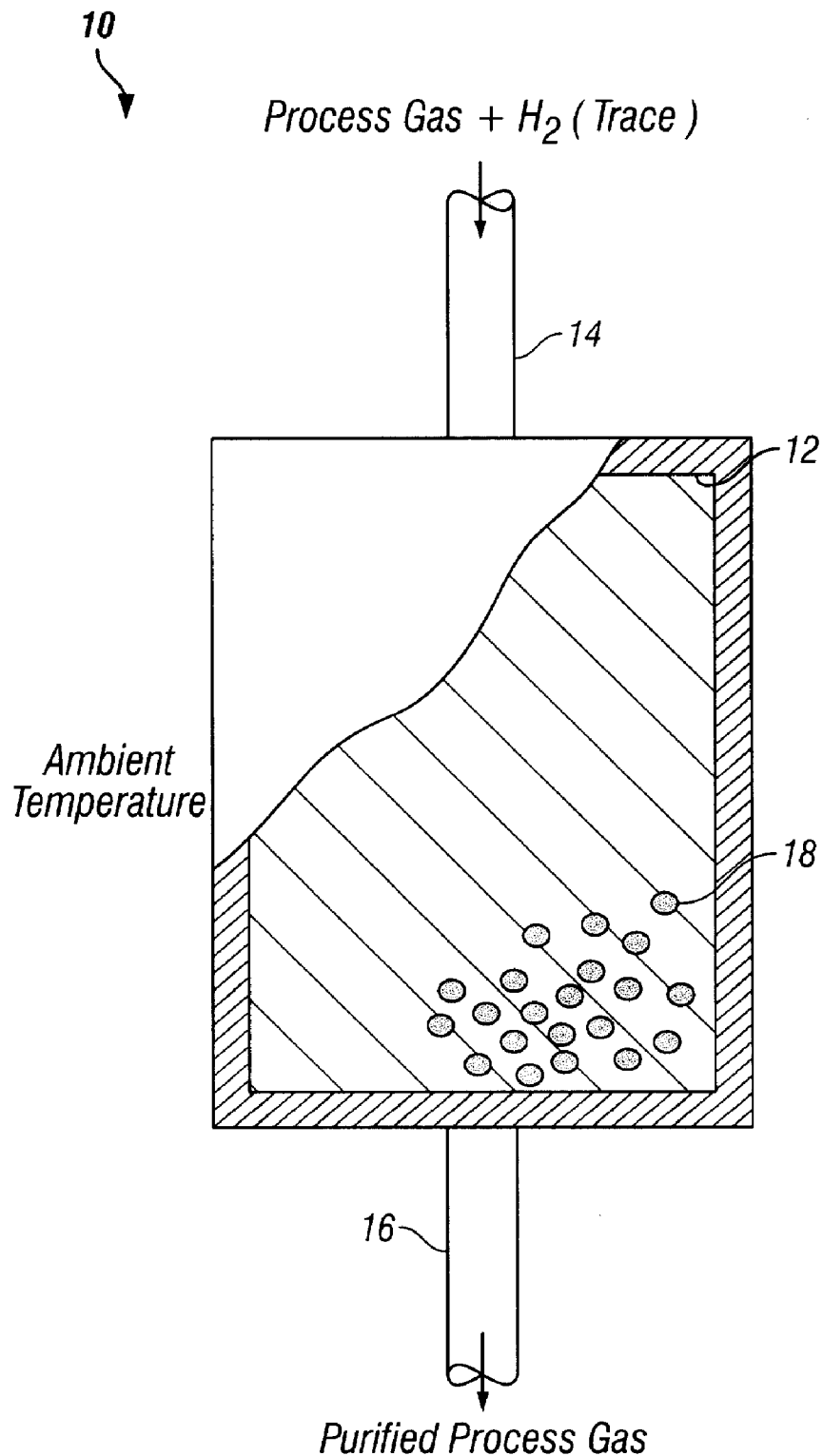
FIG. 1B is a schematic illustration of a getter purifier of the prior art during the removal of hydrogen from a process gas.
Figure 2A:
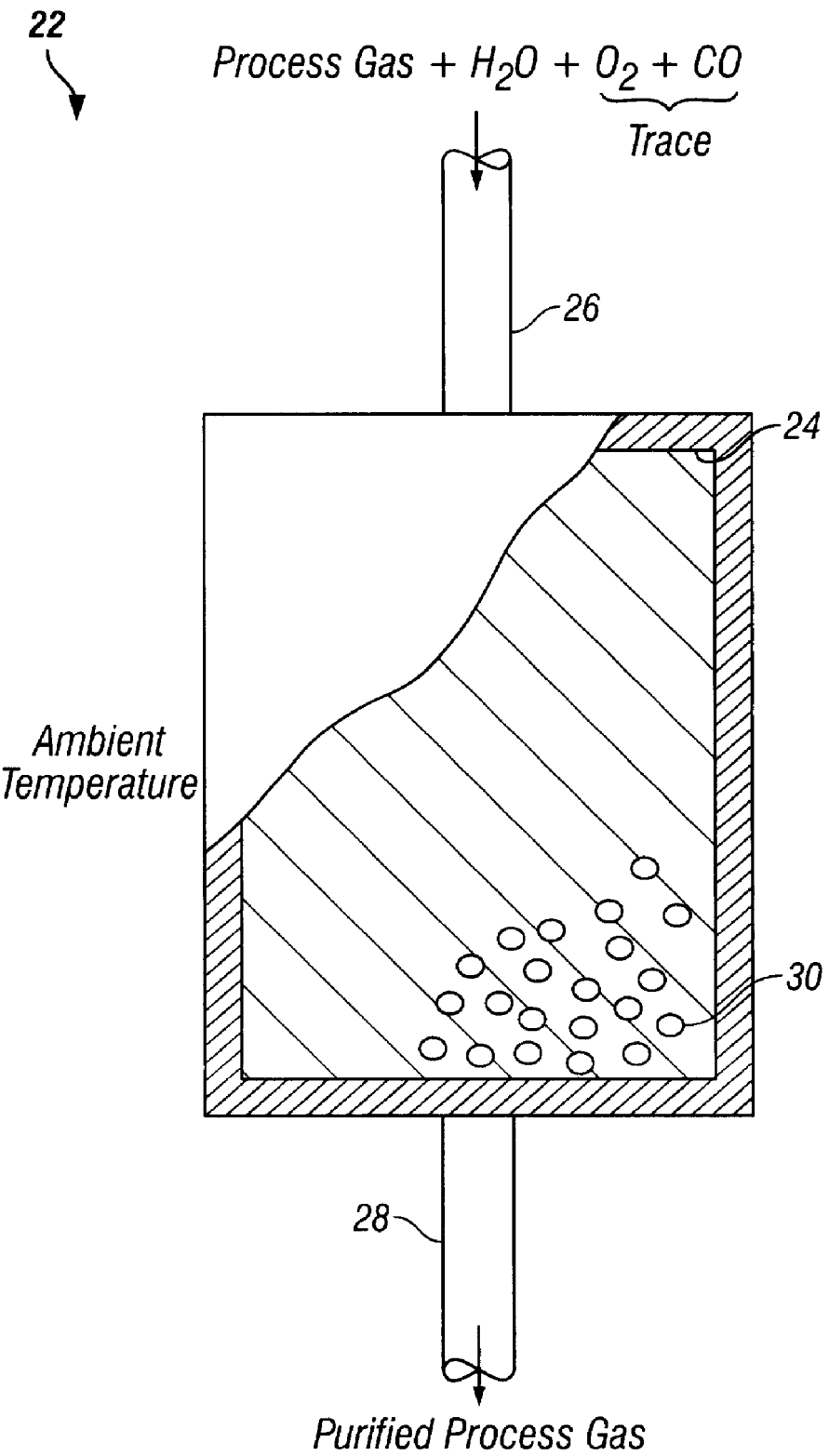
FIG. 2A is a schematic illustration of a nickel purifier of the prior art during process gas purification.
Figure 2B:
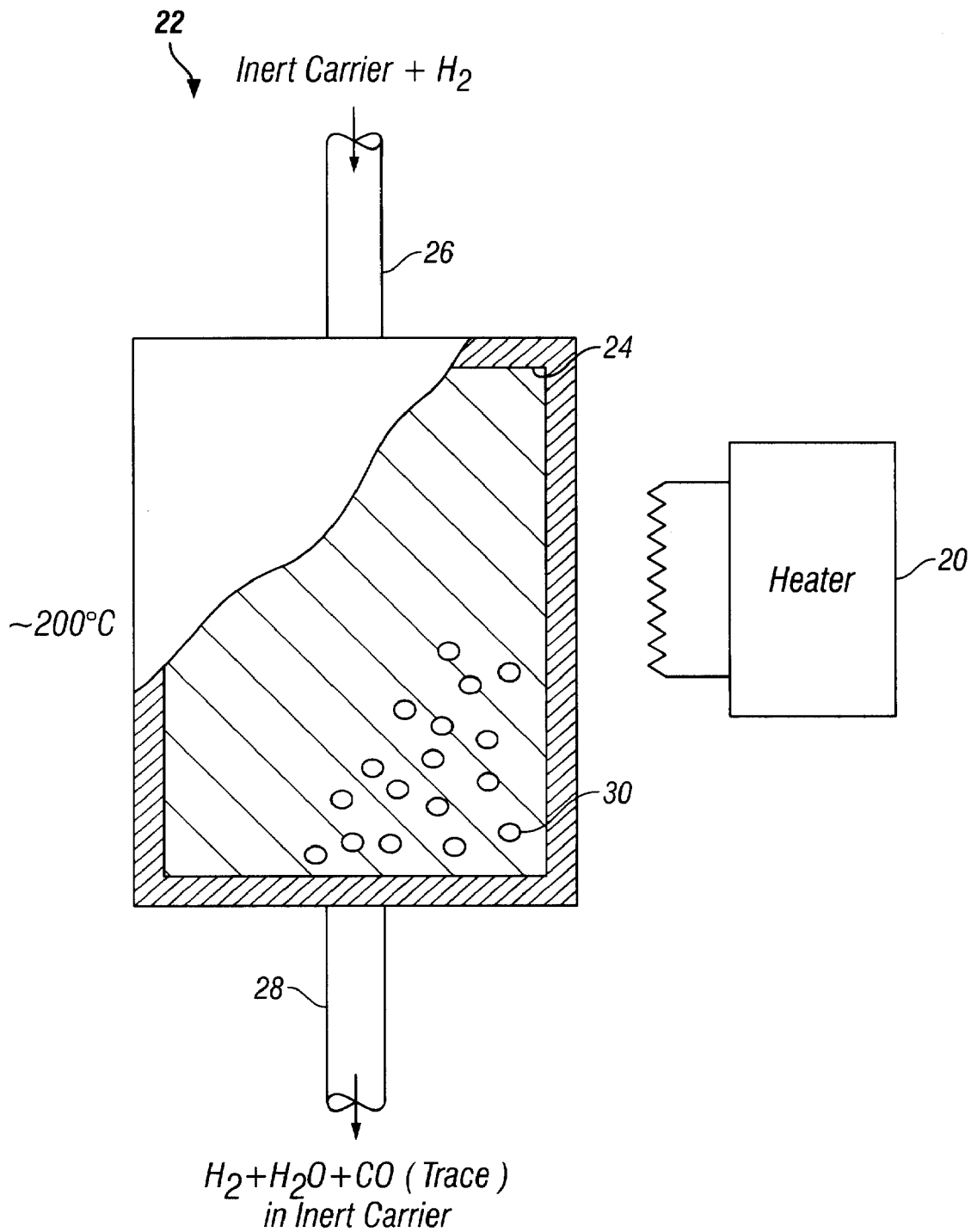
FIG. 2B is a schematic illustration of a nickel purifier of the prior art during the process of regeneration.
Figure 3:
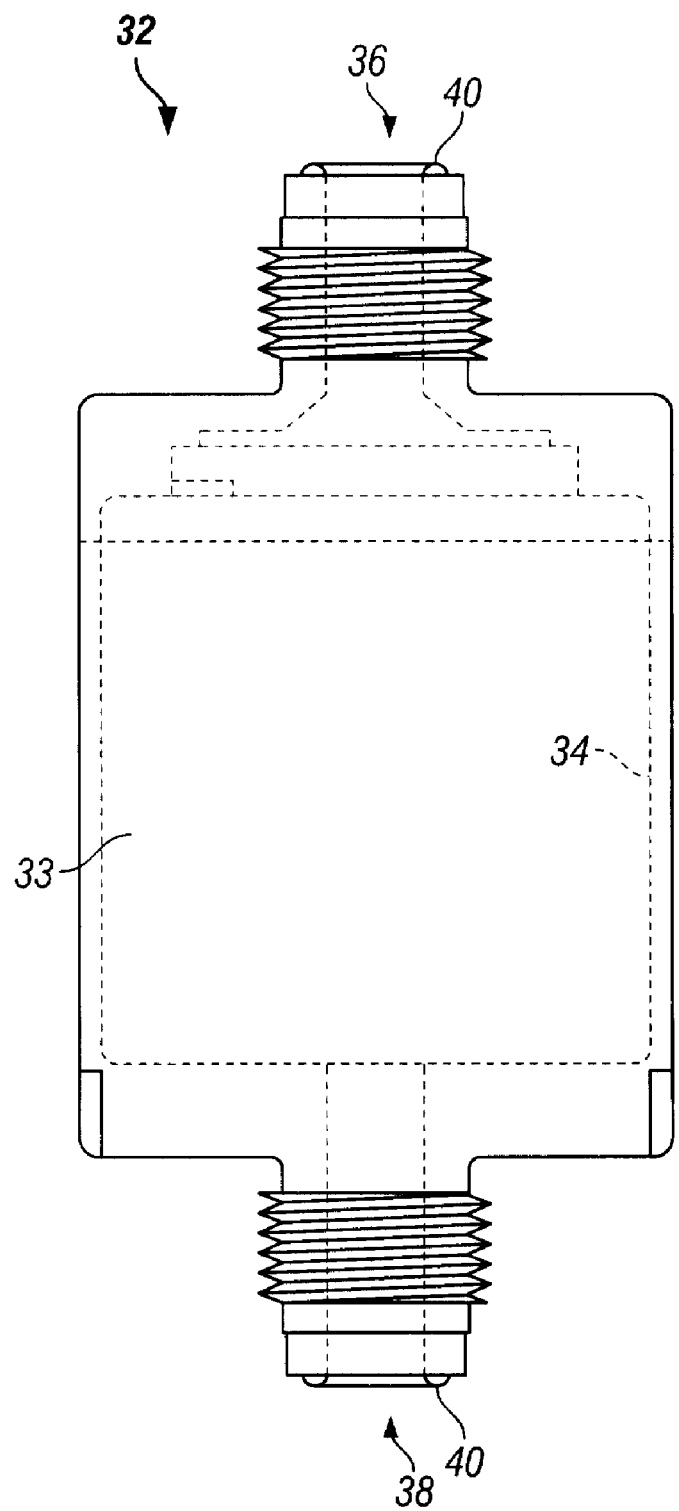
FIG. 3 illustrates a nickel purifier unit of the prior art.
Figure 4:
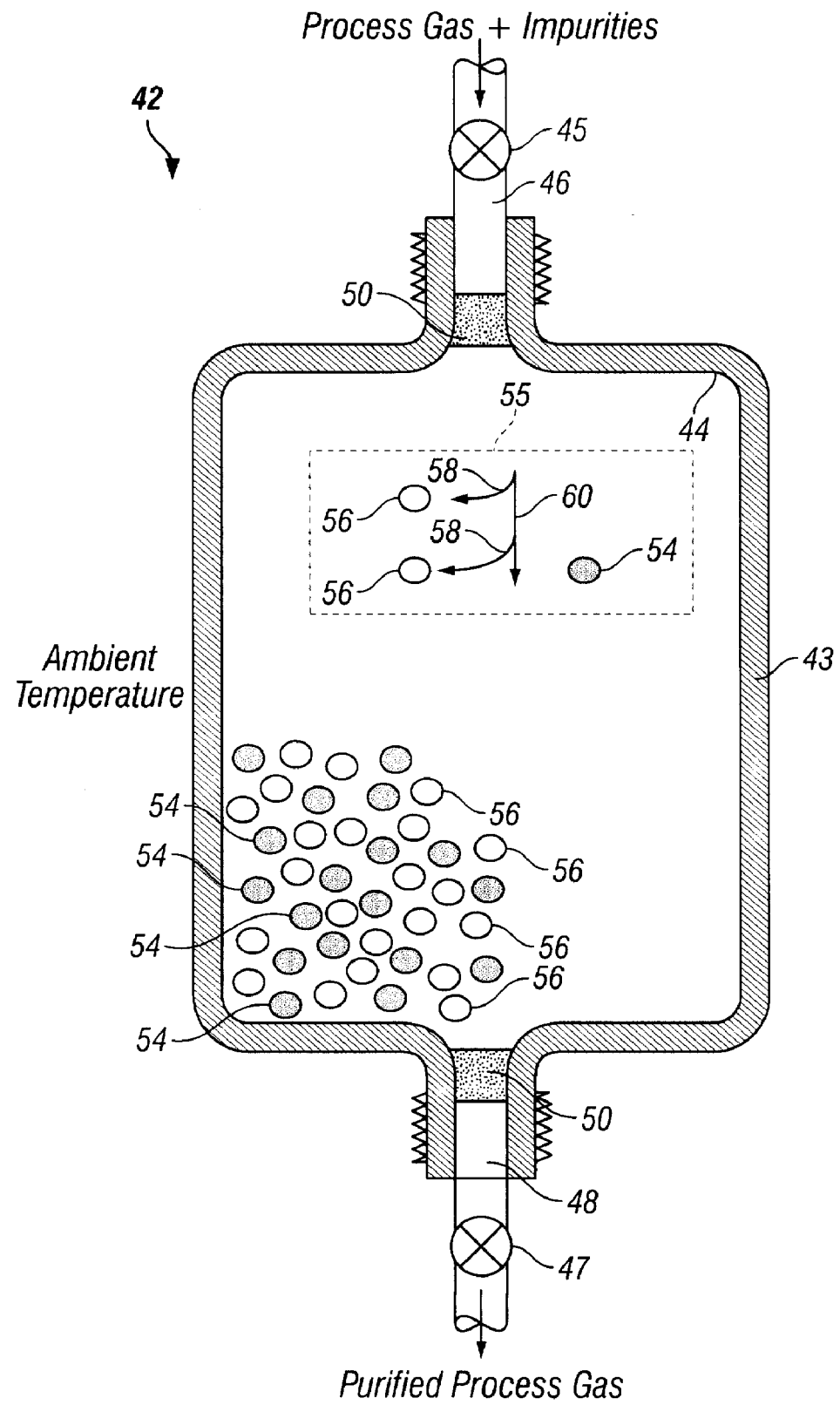
FIG. 4 illustrates rejuvenable purifier during the purification of a process gas in accordance with one embodiment of the present invention.

FIGS. 1–3 were discussed with reference to the prior art. FIG. 4 illustrates rejuvenable purifier unit 42 during the purification of a process gas in accordance with one embodiment of the present invention. Rejuvenable purifier unit 42 includes an enclosure 43 defining a chamber 44, which is coupled to an inlet 46 and an outlet 48. It should be noted that enclosure 43 can be of similar configuration and construction to enclosure 33 of prior art nickel purifier unit 32 as illustrated in FIG. 3. Inlet 46 and outlet 48 are preferably equipped with a particle filter 50 and a male face seal fitting or a compression fitting (see FIG. 3). Chamber 44 is partially filled with of getter material particles 54 and a number of transition metal material particles 56. Examples of transition metal material particles include nickel, iron, manganese, and combinations thereof. Transition metal material particles 56 preferably include nickel as described above with reference to FIG. 2A.

Rejuvenable purifier unit 42 may be operated to remove impurities from a process gas. After opening a valve 45 at inlet 46 and a valve 47 at outlet 48, the process gas to be purified flows into chamber 44 through inlet 46. When the process gas contacts the sorbing material bed, transition metal material particles 56 remove impurities from the process gas. A purified process gas then leaves the rejuvenable purifier unit 42 through outlet 48.

The portion of FIG. 4 surrounded by broken line 55 illustrates the reactions of getter material particles 54 and transition metal material particles 56 at ambient temperatures (e.g. about 25° C.) in accordance with one embodiment of the present invention. Transition metal material particles 56 absorbs impurities 58, leaving a purified process gas 60. Because rejuvenable purifier unit 42 is kept at between about 0° C. to about 50° C., and preferably between about 10° C. to about 40° C., and most preferably at about 25° C., only transition metal material particles 56 will react in this process by absorbing impurities 58. Getter material particles 54 will not react and remain inactive.

Figure 5:
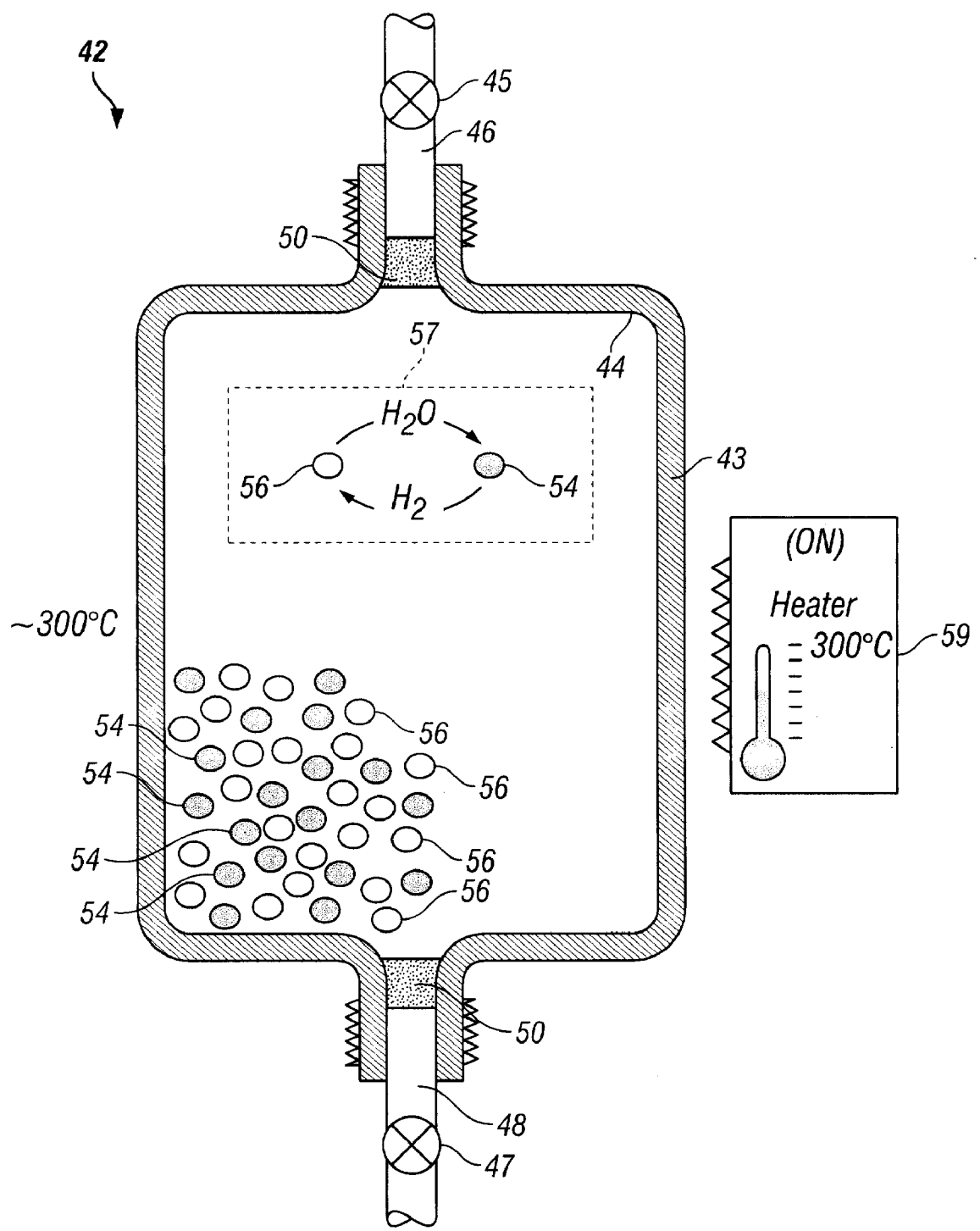
FIG. 5 illustrates rejuvenable purifier during the beginning of the rejuvenation process in accordance with one embodiment of the present invention.

FIG. 5 illustrates rejuvenable purifier unit 42 during the beginning of the rejuvenation process in accordance with one embodiment of the present invention. When rejuvenable purifier unit 42 needs to be regenerated (i.e. when transition metal material particles 56 are saturated), valves 45 and 47 are closed and the purifier is heated to between about 200° C. to about 400° C. by a heater 59 so that getter material particles 54 start to release hydrogen. The regeneration temperature is preferably fixed at about 250° C. to about 350° C., and most preferably fixed to about 300° C. to avoid overpressuring the system in the present embodiment. At higher temperatures, the release of hydrogen has a steep rise, so that the pressure in the purifier chamber can rapidly reach values in the range of tens of bars, which can endanger the mechanical stability of the purifier.

Heater 59 is preferably external to chamber 44 of enclosure 43, and may be an electro resistive, radiant, or other type of heater in conductive, radiative, or convective communication with enclosure 43. Heater 59 is preferably provided with an open or closed loop control system to control the temperature of rejuvenable purifier unit 42. For a closed loop control system, a thermal sensor (such as a thermocouple—not shown) is used to sense the temperature of the purifier, either directly or indirectly, as feedback to the heater 59 control system.

Getter material particles 54 preferably have a high equilibrium pressure at 300° C. The high equilibrium pressure is preferably above about 0.1 mbar at about 300° C. An example of such getter material is a zirconium-cobalt intermetallic compound ZrCo, which has a hydrogen equilibrium pressure above 0.25 mbar at 300° C. When the hydrogen contacts transition metal material particles 56 nickel at elevated temperatures, the hydrogen decomposes the species (impurities removed from the process gas) that have been formed on transition metal material particles 56 during the purification of the process gas. Water released in the reaction may be absorbed by hot getter material particles 54. On the getter surface, water is decomposed into oxygen and hydrogen. The oxygen will be irreversibly fixed as oxide on the getter, while hydrogen can be released again.

The portion of FIG. 5 surrounded by broken line 57 illustrates the reactions of getter material particles 54 and transition metal material particles 56 at about 300 degrees Celsius in accordance with one embodiment of the present invention. Therefore in practice, a sort of "hydrogen cycle" is realized, with hydrogen acting as an "oxygen vehicle"

from nickel surface to getter bulk. This "hydrogen cycle" is operative only when the temperature is high enough to have hydrogen not sorbed by the getter (and the purifier is isolated from the gas supply line). The main reactions occurring are:

$$NiO + H_2 \rightarrow Ni + H_2O \qquad \text{Equation 1}$$

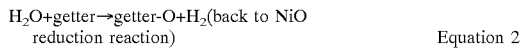

$$H_2O + \text{getter} \rightarrow \text{getter-O} + H_2 \text{(back to NiO reduction reaction)} \qquad \text{Equation 2}$$

Figure 6:
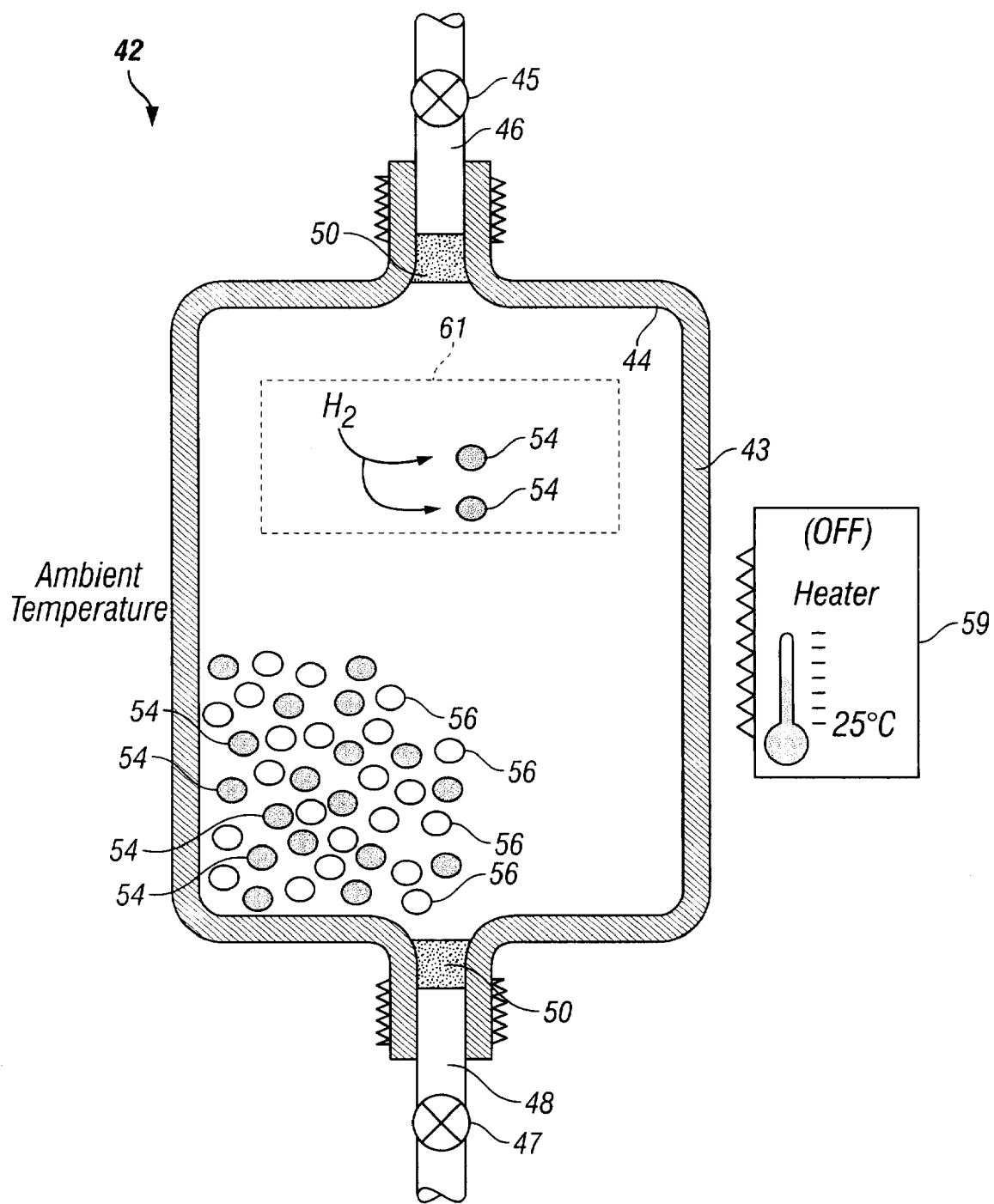
FIG. 6 illustrates rejuvenable purifier during the completion of the rejuvenation process in accordance with one embodiment of the present invention.

FIG. 6 illustrates rejuvenable purifier unit 42 during the completion of the rejuvenation process in accordance with one embodiment of the present invention. After regeneration, heater 58 is switched off. As the temperature drops down to ambient, free hydrogen not used during regeneration of transition metal material particles 56 is readsorbed by the getter material particles 54 leaving a negligible pressure of the gas in the system. Alternatively, rejuvenable purifier unit 42 can be actively cooled, with for example, forced air or a water jacket (not shown). Getter material particles 54 preferably have a low hydrogen equilibrium pressure at ambient temperatures. The low hydrogen equilibrium pressure is preferably about $10^{-6}$ mbars at 40° C. An example of such a getter material is zirconium-cobalt intermetallic compound ZrCo, that has hydrogen equilibrium pressure around $1.3 \times 10^{-6}$ mbar at 40° C.

The portion of FIG. 6 surrounded by broken line 61 illustrates the reaction of getter material particles 54 during the completion of the rejuvenation process in accordance with one embodiment of the present invention. When the valves are opened for normal purification operations, no hydrogen is introduced in the outlet gas by the purifier. With hydrogen cycling, a build-up of oxygen takes place in getter material particles 54 that eventually "kill" the capability of the getter to absorb and release hydrogen because of the presence of a thick passivating oxide layer on the getter surface. However, the overall result is that the purifier can stand a certain number of regeneration cycles before getter material particles 54 are exhausted.

To assure proper rejuvenation of the purifier, the ratio between the transition metal material and getter material within the purifier chamber must be properly designed. If there is too little getter material, then regeneration will not occur because there is not enough hydrogen available. If there is too much getter material, the extra getter material is wasted. Not only does the additional getter material increase costs, but the getter material also takes up space that could be used by the transition metal material, which does all of the purifying. Tests have shown that it is preferable to use a volume of getter material between about 20% and about 50% of the internal volume of the purifier.

The getter material is also preferably pre-charged with hydrogen in production, otherwise, one will rely on the hydrogen intake by the getter during the first purification run. However, such intake (if hydrogen content in the gas under purification is low) might not be enough for assuring good regeneration performance. On the other hand, the pre-charging level mustn't be too high, or the pressure increase in the purifier during regeneration may be excessive, with the risk of mechanical failure of the enclosure. Preferably, the amount of hydrogen absorbed in the getter bulk should span from about $10^{-3}$ to about $5 \times 10^{-3}$ moles of hydrogen per gram of alloy.

As is the case for conventional nickel purifiers, the purifiers of the present invention may contain water sorbing materials. The water sorbing materials may be physical sorbers such as molecular sieves, alumina, silica, etc. or chemical sorbers, and are preferably molecular sieves 13x. It is preferred that the water sorbing material be able to release water at regeneration conditions to ensure that water released by NiO reduction will reach the getter materials giving rise to free hydrogen. This increases the amount of hydrogen taking part in the "hydrogen cycle", thereby increasing the probability of having effective regeneration operations in the future. If a water sorber is added to the purifier, then the volume of getter material is preferably between about 15% and about 40% of the internal volume of the purifier chamber.

As a practical example, a purifier of internal volume 200 cc may include a three-materials mixture comprising particulate ZrCo, nickel supported on porous silica, and molecular sieves 13x(not shown). The sorbing capacity of absorbing beds in this field of art is often measured in liters/liters (l/l), and indicates the liters of gas, as measured at standard temperature and pressure, that can be removed by one litre of the absorbing bed, measured as actual volume occupied by particles of that material. The nickel material bed may have a capacity of 20 l/l for oxygen and a capacity of 15 l/l for water. The molecular sieves 13x have 25 l/l of capacity for water. To assure that the purifier has the same removing capability for oxygen and water during purification, it will preferably contain nickel material and molecular sieves in a volume ratio between of about 5:1, while the volume of ZrCo is preferably between about 35 and 75 cc.

Figure 7:
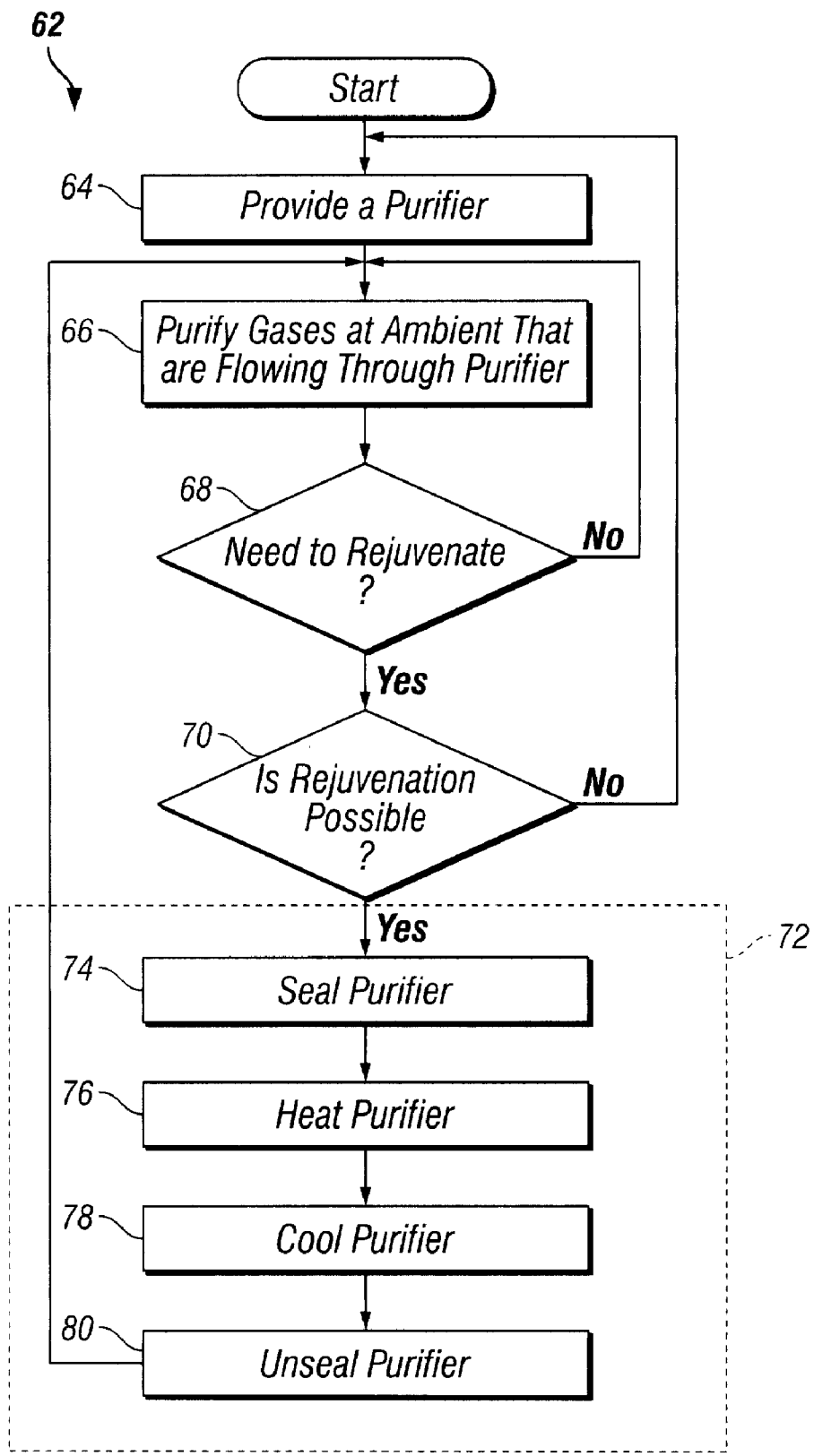
FIG. 7 is a flow chart of a method for purifying gases at ambient temperatures.

FIG. 7 is a flow chart of a method 62 for purifying gases at ambient temperatures. Method 62 begins with an act 64 where a purifier is provided. The purifier is used in an act 66 to purify gases at an ambient temperature by introducing a process gas into the purifier chamber. Impurities in the process gas are removed by transition metal material particles inside the purifier chamber so that a purified process gas may exit the purifier chamber. An act 68 then determines whether there is a need to rejuvenate the purifier. If not, the purification continues with act 66. If the transition metal material particles have been saturated ("exhausted"), then method 62 proceeds to an act 70, which determines whether rejuvenation is possible. If rejuvenation is not possible, then a new purifier should be provided in act 64.

It is possible to determine whether rejuvenation is possible in act 68 by a number of techniques. For one, the purifier may be rejuvenated at set time intervals, after a certain amount of gas has been purified, etc. Alternatively, detection equipment at the outlet of the purifier can be used to detect when the trace gases are not being removed by the purifier, indicating that it is time to regenerate or replace the purifier.

If rejuvenation is possible, then a method 72 for rejuvenating the purifier begins by sealing the purifier, typically by closing the inlet and outlet valves in an act 74. The purifier is then heated to about 300 degrees Celsius in an act 76. At the higher temperature, getter material particles inside the purifier chamber begin releasing hydrogen gas. The hydrogen then decomposes the impurities that formed on the transition metal material particles during purification of the process gas in act 66. The purifier is then cooled in an act 78. As the purifier cools back to an ambient temperature, hydrogen that was not used during regeneration is absorbed by the getter material particles. The purifier is then unsealed in an act 80, and method 62 is ready to return to act 66 to begin the purification of process gases.

It will therefore be appreciated that the present invention provides a method and apparatus of purifying gases, and then rejuvenating the gas purifier by utilizing a transition metal material and a getter material in the purifier chamber.

The invention has been described herein in terms of several preferred embodiments. Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A rejuvenable gas purifier comprising;
   an enclosure provided with a chamber having and inlet and an outlet;
   purifier material disposed with said chamber, said purifier material comprising a mixture of a transition metal material and a getter material, said transition metal material being in a dispersed form with at least 5% of said transition metal material being in metallic form, said getter material being in a dispersed form intermixed with said transition metal material and selected from among the group consisting of Zr, Ti, Nb, Ta, V and alloys thereof, said transition metal material selected from the group of transition metals, and oxides thereof, wherein said getter material is pre-charged with hydrogen, such that there are from about 0.001 moles to 0.005 moles of hydrogen per gram of getter material.

2. The rejuvenable gas purifier as recited in claim 1, wherein said transition metal material is selected from among the group consisting of Fe, Mn, Ni and oxides thereof.

3. The rejuvenable gas purifier as recited in claim 1, wherein said transition metal material is supported by a porous substrate.

4. A rejuvenable gas purifier as recited in claim 3, wherein said getter material has a low hydrogen equilibrium pressure at a range from 0 to 50 degrees Celsius and a higher hydrogen equilibrium pressure at about 300 degrees Celsius, wherein said getter material has a low hydrogen equilibrium pressure of about $10^{-6}$ mbar and a high hydrogen equilibrium pressure of above about 0.1 mbar.

5. A rejuvenable gas purifier as recited in claim 4, wherein said getter material is ZrCo.

6. The rejuvenable gas purifier as recited in claim 1, wherein said getter material occupies from about 20% to about 50% of the internal volume of said purifier.

7. The rejuvenable gas purifier as recited in claim 1, further comprising water sorbing material.

8. A rejuvenable gas purifier as recited in claim 7, wherein said water sorbing material is a molecular sieve.

9. A rejuvenable gas purifier as recited in claim 8, wherein said getter material occupies from about 15% to about 40% of the internal volume of said purifier.

10. A rejuvenable gas purifier system comprising:
    (a) a purifier including:
       an enclosure provided with a chamber having an inlet and an outlet; and
       purifier material disposed within said chamber, said purifier material comprising a mixture of a transition metal material and a getter material, said transition metal material being in a dispersed form with at least 5% of the transition metal material being in metallic form, said getter material being in a dispersed form intermixed with said transition metal material and selected from the group consisting of Zr, Ti, Nb, Ta, V, and alloys thereof, said transition metal material selected from the group of transition metals and oxides thereof;
       wherein said getter material is pre-charged with hydrogen such that there are from about 0.001 moles to 0.005 moles of hydrogen per gram of getter material;
    (b) an inlet valve coupled to said inlet;
    (c) an outlet valve coupled to said outlet; and
    (d) a heater associated with said purifier for heating said purifier to at least about 200 degrees Celsius.

11. A rejuvenable gas purifier system as recited in claim 10, wherein said purifier is heated to about 300 degrees Celsius.

12. A rejuvenable gas system as recited in claim 11, wherein said getter material has a low hydrogen equilibrium pressure at an ambient temperature and a higher hydrogen equilibrium pressure at about 300 degrees Celsius, wherein said getter material has a low hydrogen equilibrium pressure of about $10^{-6}$ mbar and a high hydrogen equilibrium pressure of about 0.1 mbar.

13. A rejuvenable gas purifier system as recited in claim 12, wherein said getter material is ZrCo.

14. A rejuvenable gas purifier system as recited in claim 10, wherein said getter material occupies from about 20% to about 50% of the internal volume of said purifier.

15. A rejuvenable gas purifier system as recited in claim 10, further comprising a water sorbing material.

16. A rejuvenable gas purifier system as recited in claim 15, wherein said water sorbing material is a molecular sieve.

17. A rejuvenable gas purifier as recited in claim 16, wherein said getter material occupies from about 15% to about 40% of the internal volume of said purifier.

18. A rejuvenable gas purifier as recited in claim 10, wherein said transition metal material is selected from the group consisting of Fe, Mn, Ni, and combinations thereof.

19. A rejuvenable gas purifier as recited in claim 10, wherein said transition metal material is supported by a porous substrate.

20. A gas purification device including a chamber containing a purification material, said purification material being comprised of an admixture of a getter material and a transition metal material, said device also including a means for inlet and a means for outflow,
    wherein said getter material releases a hydrogen gas when said device is heated to more than 250 degrees centigrade but less than 350 degrees centigrade, and said hydrogen gas is absorbed by said getter material when said device is operated at temperatures between 0 to 50 degrees centigrade;
    wherein said getter material is pre-charged with hydrogen such that there are from about 0.001 moles to 0.005 moles of hydrogen per gram of getter material;
    wherein said transition metal material is capable of removing contaminants from a gas at a temperature from 0 to 50 degrees centigrade, wherein said transition metal material releases contaminants into said released hydrogen gas when said device is heated to between 250 and 350 degrees centigrade,
    whereby said transitional metal material is rejuvenated and contaminants are absorbed by said getter material.

* * * * *